United States Patent [19]

Heidemann et al.

[11] Patent Number: 5,719,874
[45] Date of Patent: Feb. 17, 1998

[54] TIME-DIVISION-MULTIPLEXING METHOD AND APPARATUS

[75] Inventors: Rolf Heidemann, Tamm; Heinz Krimmel, Korntal-Münchinger; Jürgen Otterbach, Leonberg, all of Germany

[73] Assignee: Alcatel Sel A.G., Stuttgart, Germany

[21] Appl. No.: 547,708

[22] Filed: Oct. 19, 1995

Related U.S. Application Data

[63] Continuation of Ser. No. 305,762, Aug. 26, 1994, abandoned.

[30] Foreign Application Priority Data

Sep. 3, 1993 [DE] Germany .................. 43 29 733.1

[51] Int. Cl.⁶ .................................................. H04J 3/16
[52] U.S. Cl. ...................... 370/535; 370/540; 370/544
[58] Field of Search ............................. 370/535, 536, 370/537, 538, 539, 540, 541, 542, 543, 544, 498, 529

[56] References Cited

U.S. PATENT DOCUMENTS

| | | | |
|---|---|---|---|
| 4,271,508 | 6/1981 | Schenk | 370/112 |
| 4,805,165 | 2/1989 | Kawamura et al. | 370/112 |
| 4,866,709 | 9/1989 | West et al. | 370/82 |
| 4,891,808 | 1/1990 | Fallin | 370/468 |
| 4,912,706 | 3/1990 | Eisenberg et al. | 370/507 |
| 5,005,171 | 4/1991 | Modisette et al. | 370/112 |
| 5,136,587 | 8/1992 | Obana et al. | 370/535 |
| 5,313,467 | 5/1994 | Varghese et al. | 370/468 |
| 5,327,422 | 7/1994 | Abefelt et al. | 370/112 |

FOREIGN PATENT DOCUMENTS

| | | |
|---|---|---|
| 0311251 | 4/1989 | European Pat. Off. . |
| 0553610 | 8/1993 | European Pat. Off. . |
| 3346501 | 7/1985 | Germany . |
| 3435652 | 4/1986 | Germany . |
| 3925309 | 2/1991 | Germany . |
| 4123007 | 1/1993 | Germany . |
| 949831 | 8/1982 | U.S.S.R. . |

OTHER PUBLICATIONS

"Optoelectronics in the Subscriber Loop", L. Adnet et al, *Electrical Communication*, 4th Quarter 1992, pp. 58–65.

P. Bocker, "Datenubertragung, Band 2, Einrichtungen und Systeme", Springer–Verlag, Berlin, Heidelberg, New York, 1979, pp. 91–103.

Stalling, William, "Data and computer communications," 2nd ed., Macmillian Publishing Co., 1988, pp. 182–187, 1988.

*Primary Examiner*—Douglas W. Olms
*Assistant Examiner*—Ricky Q. Ngo
*Attorney, Agent, or Firm*—Ware, Fressola, Van Der Sluys & Adolphson LLP

[57] ABSTRACT

In known optical distribution systems, a signal intended for the subscribers is distributed from a transmitting point to all network terminations (point-to-multipoint transmission). The receivers, which are connected to a passive optical network, are adapted to a common bit rate. If a need for a higher data rate arises at a network termination, this need can only be satisfied in the prior art by converting all receivers. This is not possible without interrupting the service. Furthermore, the conversion entails great expense, since the receivers of these network terminations where the need for information is unchanged have to be converted as well. By a time-division-multiplexing method, a time-division multiplex signal is generated which has a frame whose duration is equal to one bit period (T) of a digital signal, and which is divided into k time slots (ZS). At least two time slots (ZS) are used for one digital signal, and one respective time slot (ZS) is used for each of the remaining digital signals.

15 Claims, 3 Drawing Sheets

TIME-DIVISION-MULTIPLEXING METHOD AND APPARATUS

This is a continuation of application Ser. No. 08/305,762 filed on Aug. 26, 1994 now abandoned.

TECHNICAL FIELD

The present invention relates to a time-division-multiplexing method for transmitting at least two digital signals of the same bit rate.

BACKGROUND OF THE INVENTION

Such methods are generally known, e.g., from a textbook by Bocker P., "Datenübertragung, Band 2, Einrichtungen und Systeme", Springer-Verlag, Berlin, Heidelberg, New York, 1979, pages 91 to 103.

In the time-division multiplex systems described there, the information bits of the individual channels are interleaved bit by bit. The bit periods of the individual channels in the time-division multiplex signal are of the same length, i.e., within a frame of the time-division multiplex signal, each channel occupies the same time duration.

A demultiplexer contained in the receiver allocates the bits contained in the time-division multiplex signal to the individual channels. If the time-division multiplex signal is received by several receivers, all receivers are designed for the common bit rate.

These receivers have a low-pass-filter function with a finite bandwidth, so that it takes a certain time until the receiver has reached its steady-state condition and can sample the signal.

Thus, the time duration occupied by a channel within a frame, also referred to as "time slot", must not be too short: A steady-state condition of the receiver during reception of a logic 1 must be ensured.

Since the invention is connected with an optical transmission system, it will be described in reference to an optical transmission system, but it is also applicable to electrical transmission systems.

An optical transmission system is known from L. Adnet, et al. "Optoelectronics in the Subscriber Loop", Electrical Communication, 4th Quarter 1992, pages 58 to 65.

There, optical signals are transmitted between the exchange and distribution center and the network terminations via a passive optical network. Via the latter, which is built with optical splitters, the signal intended for the subscribers is distributed from a transmitter to all network terminations. The receivers connected to the passive optical network are adapted to a common bit rate.

If at any of the network terminations the problem arises that a greater need for information must be satisfied, i.e., if an additional channel is to be provided, this can be achieved by time-division multiplex transmission.

In conventional time-division-multiplexing methods, in which signals of equal bit period are combined into a time-division multiplex signal, the duration of a time slot is given by the bit period of a signal divided by the number of signals.

For receivers which are still interested in only one single signal (channel), the problem is to extract this signal from the time-division multiplex signal, since with unchanged frame, the time slots become shorter; the transient recovery time of the receivers is too long to properly evaluate the signal.

Accordingly, with conventional time-division multiplex systems, a need for more information could be satisfied only by converting all receivers. This would not be possible without interrupting the service. Furthermore, the conversion would entail great expense, since the receivers of those network terminations where the need for information is unchanged would have to be converted as well.

DISCLOSURE OF INVENTION

It is the object of the invention to provide a time-division-multiplexing method wherein a time-division multiplex signal is generated which can be evaluated by all receivers, i.e., wherein all receivers can take from the time-division multiplex signal the information intended for them.

According to the present invention, a time-division-multiplexing method for transmitting n digital signals of the same bit rate, wherein n is greater than or equal to 2, and wherein said digital signals are combined into a time-division multiplexed signal having a frame which contains k time slots and whose duration is equal to the bit period of one of the digital signals, is characterized in that a first selected number of time slots being at least two time slots in number are used for one of the digital signals, and wherein a second selected number of time slots being less than said first selected number is used for at least one of the remaining digital signals.

In further accord with the present invention, two digital signals are combined into a time-division multiplexed signal, wherein the frame is divided into three time slots, and wherein two time slots are used for one digital signal and one time slot is used for the other.

In still further accord with the present invention, two digital signals are combined into a time-division multiplexed signal, wherein the frame is divided into four time slots, and wherein three time slots are used for one digital signal and one time slot is used for the other.

According still further to the present invention, three digital signals are combined into a time-division multiplexed signal, wherein the frame is divided into four time slots, and wherein two time slots are used for one digital signal, and one respective time slot is used for each of the other two.

One advantage of the invention is that in existing systems, the receivers can be converted successively according to the individual need for information.

These and other objects, features and advantages of the present invention will become more apparent in light of the detailed description of a best mode embodiment thereof, as illustrated in the accompanying drawing.

BEST MODE FOR CARRYING OUT THE INVENTION

Figure 1:
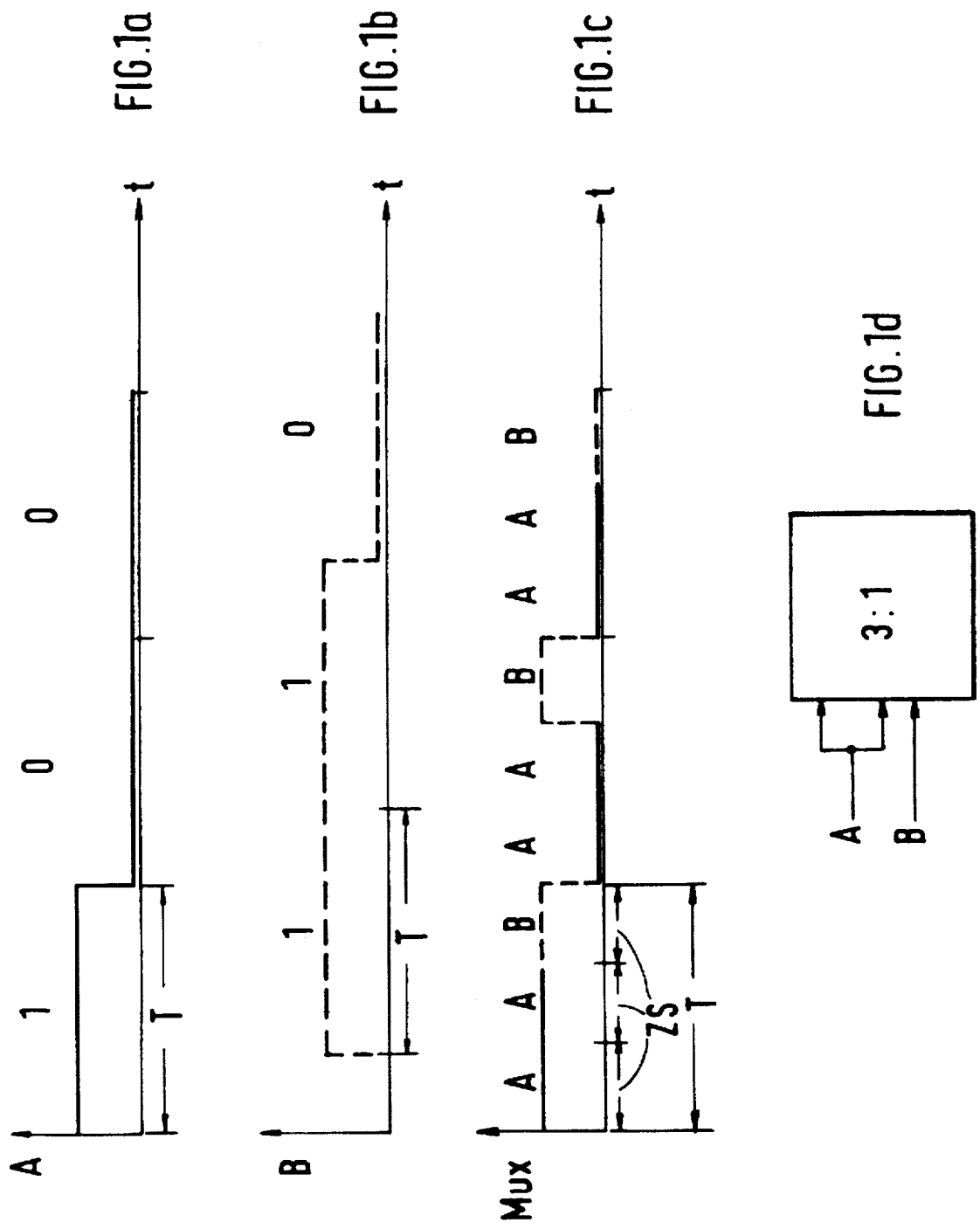
FIGS. 1a–c show the formation of a time-division multiplex signal from two digital signals A and B, according to the present invention.
FIG. 1d shows a multiplexer for carrying out the method of FIGS. 1a–c.

FIGS. 1a–c illustrate, with respect to a common time line how two digital signals A, B are combined into a time-division multiplex signal Mux, according to the present invention. FIG. 1a shows a portion of the digital signal A with the bits 1, 0, 0. FIG. 1b shows a portion of the digital signal B with the bits 1, 1, 0. The digital signals A, B have the same bit period T and, hence, the same bit rate. To better distinguish the two digital signals, the signal B is shown by a broken line.

The resulting time-division multiplex signal Mux is shown in FIG. 1c. The two digital signals A, B are arranged successively in time in a periodically recurring fashion. The period of this process forms a frame whose duration is equal to the bit period T of the digital signals A, B.

By this time-division-multiplexing method, the frame is divided into k=3 time slots ZS. Two time slots ZS are used for the transmission of the digital signal A, and only one time slot ZS is used for the transmission of the digital signal B. Referred to the time slots ZS, the time-division multiplex signal Mux has three times the bit rate of the respective digital signals A, B. The division of the frame between the digital signals is illustrated by letters A, B.

FIG. 1d shows how the digital signals A and B are fed to a 3:1 multiplexer. The 3:1 multiplexer combines three input signals (2×A, 1×B) into a frame.

Figure 2:
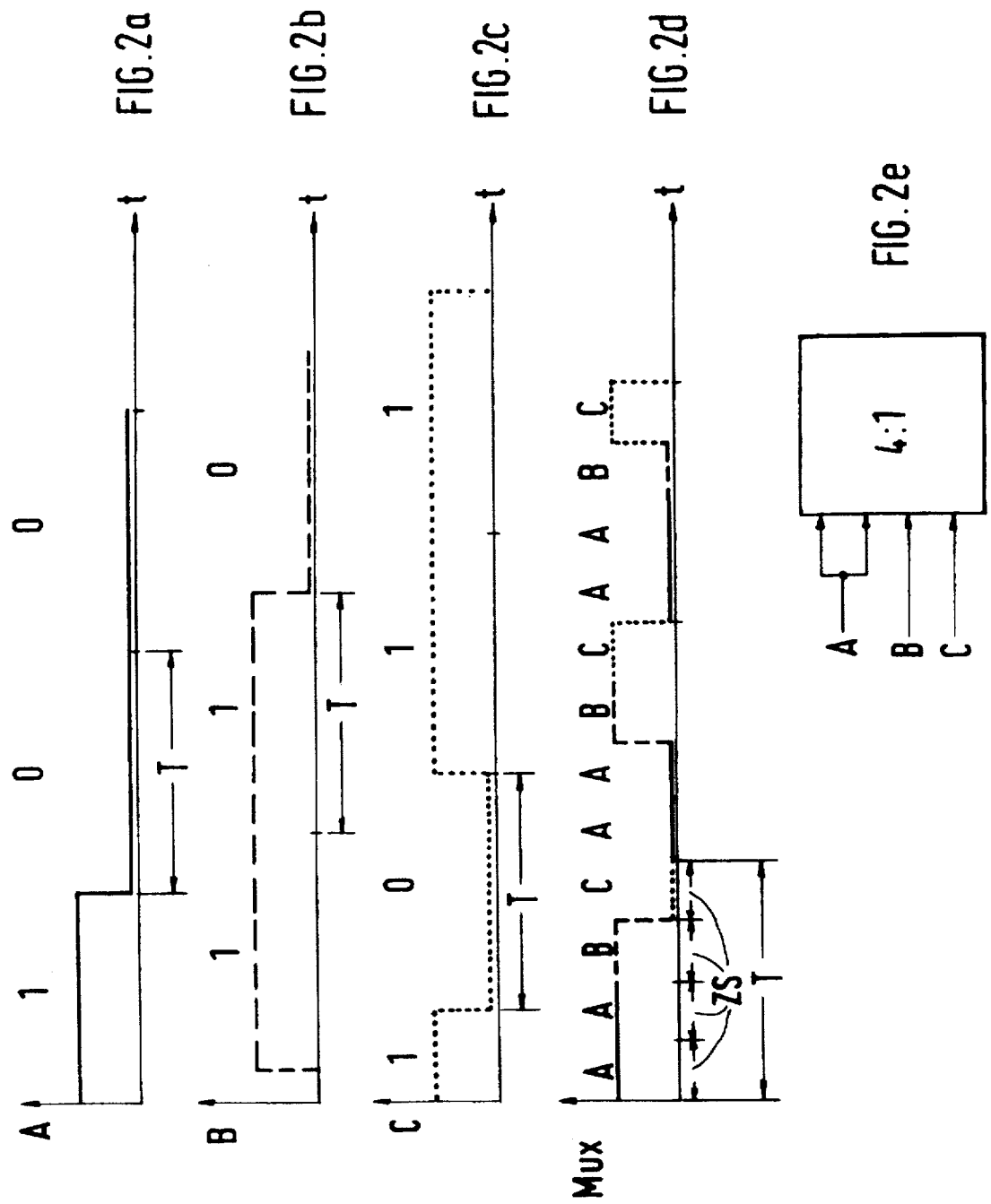
FIGS. 2a–d show the formation of a time-division multiplex signal from three digital signals A, B, and C, according to the present invention.
FIG. 2e shows a multiplexer for carrying out the method of FIGS. 2a–d.
Figure 3:
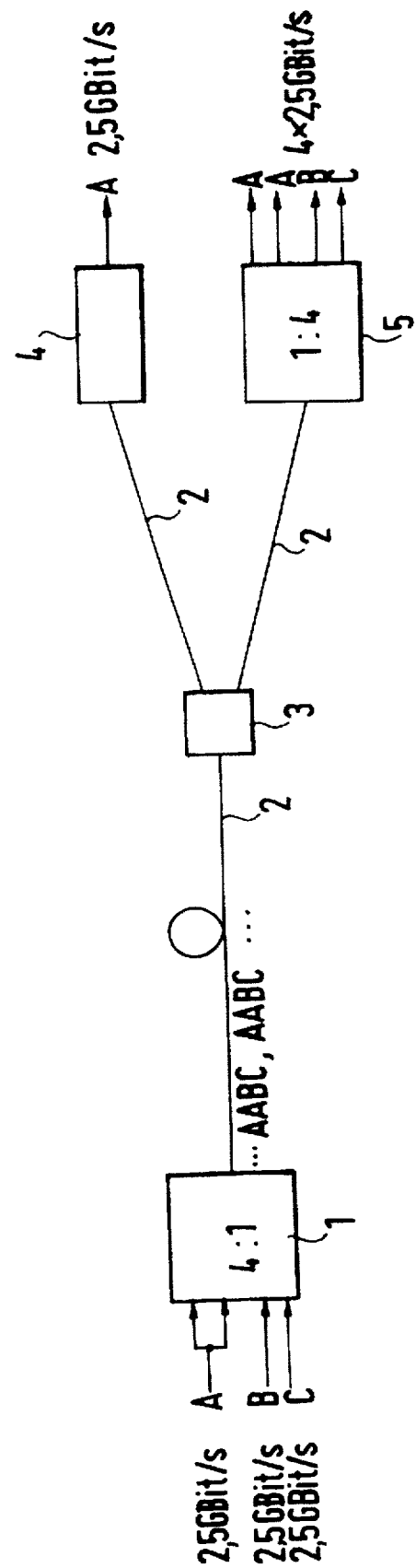
FIG. 3 shows a transmission system in which the novel time-division-multiplexing method is employed, according to the present invention.

FIGS. 2a–3 show, with respect to a common time line how three digital signals A, B, C are combined into a time-division multiplex signal Mux, according to another example of the present invention. The digital signals A, B correspond to those of FIGS. 1a and 1b. The dotted portion of the digital signal C in FIG. 2c has the bits 1, 0, 1, 1. The time-division multiplex signal Mux formed from these digital signals is shown in FIG. 2d.

All signals have the same bit period T. By the time-division-multiplexing method, the frame is divided into k=4 time slots ZS. Two time slots ZS are used for the transmission of the digital signal A, but only one is used for the transmission of the digital signal B, and one for the transmission of the digital signal C.

Related to the time slots ZS, the time-division multiplex signal Mux has four times the bit rate of the respective digital signals A, B, C.

FIG. 2e shows how the digital signals A, B, and C are fed to a 4:1 multiplexer. The 4:1 multiplexer combines four input signals (2×A, 1×B, 1×C) into a frame.

Two digital signals A, B, such as those shown in FIGS. 1a and 1b, can also be combined into a frame in such a way that the frame is divided into k=4 time slots ZS. In that case, three time slots ZS are used for the transmission of the digital signal A, but only one is used for the transmission of the digital signal B. The bit rate is thus quadrupled.

If the digital signals A, B, C have a bit rate of 2.5 Gb/s, the bit period T and the frame duration are 400 ps. In the time-division multiplex signal Mux shown in FIG. 1c, each time slot ZS has a duration of 133.3 ps. This gives a bit rate of the time-division multiplex signal of 7.5 Gb/s, with the information bit rate being only 5 Gb/s, since the digital signal A is present in the time-division multiplex signal twice as long as the digital signal B.

In the time-division multiplex signal Mux shown in FIG. 2d, each time slot ZS has a duration of 100 ps, and the bit rate of the time-division multiplex signal is 10 Gb/s. The information bit rate is 7.5 Gb/s, since the digital signal A is present in the time-division multiplex signal twice as long as each of the digital signals B, C.

FIG. 3 shows a transmission system in which the time-division-multiplexing method is used. The transmission system consists essentially of a 4:1 multiplexer 1 at the transmitting end, a transmission link 2, a splitter 3, and two receivers 4, 5. For this simplified representation, the 4:1 multiplexer includes means (not shown) for transmitting the time-division multiplex signal, e.g., a laser. At the receiving end, the transmission system has means (not shown) for receiving the time-division multiplex signal, e.g., photodiodes, demultiplexers, and clock recovery units.

The digital signals A, B, C, which each have a bit rate of 2.5 Gb/s, are fed to the 4:1 multiplexer 1 (2×A, 1×B, 1×C), and the time-division multiplex signal formed by the multiplexer is transmitted via the transmission link 2 and the splitter 3, which separates it into two equal parts, to the first receiver 4 and the second receiver 5. The first receiver 4, which samples the time-division multiplex signal at 2.5 GHz, can evaluate only the digital signal A.

The second receiver 5, which samples the time-division multiplex signal at a frequency of 10 GHz, evaluates the digital signal B and the digital signal C. It can also simultaneously evaluate the digital signal A, however.

A subscriber connected to the receiver 5 can thus receive four digital signals at a bit rate of 2.5 Gb/s each.

This time-division-multiplexing method leaves the length of the frame unchanged. The division and the length of the time slots ZS within the frame are such that the receivers can extract the digital signal intended for them from the time-division multiplex signal.

The time-slot duration used to transmit the digital signal A is sufficient for the first receiver 4 to reach its steady-state condition. To evaluate the digital signals A and C, the transient recovery time of the first receiver 4 is too long.

The second receiver 5 is so designed that its transient recovery time is short enough to enable the receiver to reach its steady-state condition during a time slot in which the digital signal A or B is transmitted. Its 4:1 demultiplexer can thus deliver at its outputs both the digital signal A and the digital signal B and the digital signal C.

In the examples, the digital signal for which at least two time slots are used is located at the beginning of a frame; it may also be located at another point of the free.

The synchronization of a demultiplexer is no problem, since the frame characteristic of at least two equal time slots is readily recognizable. Although the invention has been shown and described with respect to a best mode embodiment thereof, it should be understood by those skilled in the art that the foregoing and various other changes, omissions and additions in the form and detail thereof may be made therein without departing from the spirit and scope of the invention.

We claim:

1. A time-division-multiplexing method for transmitting n (n≧2) digital signals of a same bit period (T) wherein said digital signals are combined into a time-division multiplex signal (Mux) having a frame which contains k time slots (ZS), said frame having a duration equal to said bit period with each time slot having a duration less than said bit period divided by n, wherein at least two adjacent time slots (ZS) are used for each bit of one of the digital signals and at least one respective time slot is used for each bit of each of the remaining digital signals.

2. A time-division-multiplexing method as claimed in claim 1, wherein n=2 and therefore two digital signals are combined into a time-division multiplex signal (Mux), and wherein the frame is divided into three time slots (ZS), and wherein two time slots (ZS) are used for each bit of one digital signal and one time slot (ZS) is used for each bit of the remaining digital signal.

3. A time-division-multiplexing method as claimed in claim 1, wherein n=2 and therefore two digital signals are combined into a time-division multiplex signal, and wherein the frame is divided into four time slots (ZS), and wherein three time slots (ZS) are used for each bit of one digital signal and one time slot (ZS) is used for each bit of the remaining digital signal.

4. A time-division-multiplexing method as claimed in claim 1, wherein n=3 and therefore three digital signals are combined into a time-division multiplex signal (Mux), and wherein the frame is divided into four time slots (ZS), and wherein two time slots (ZS) are used for each bit of one digital signal and one respective time slot (ZS) is sued for each bit of at least one of two remaining digital signals.

5. A time-division-multiplexing method for transmitting n digital signals of a same bit period (T) where n is greater than or equal to 2, wherein said digital signals are combined into a time-division multiplex signal (Mux) having a frame which contains k time slots (ZS) and having a frame duration equal to said bit period (T) with each time slot having a duration less than said bit period divided by n, wherein a first selected number of time slots being at least two adjacent time slots (ZS) in number are used for each bit of one of the digital signals and wherein a second selected number of time slots being lesser in number than said first selected number is used for each bit of at least one of the remaining digital signals.

6. A time-division-multiplexing method as claimed in claim 5, wherein n=2 and therefore two digital signals are combined into a time-division multiplex signal (Mux), wherein the frame is divided into three time slots (ZS), and wherein two adjacent time slots (ZS) are used for one digital signal and one time slot (ZS) is sued for the remaining digital signal.

7. A time-division-multiplexing method as claimed in claim 5, wherein n equals two and therefore two digital signals are combined into a time-division multiplex signal, wherein the frame is divided into four time slots (ZS), and wherein three adjacent time slots (ZS) are used for one digital signal and one time slot (ZS) is used for the remaining digital signal.

8. A time-division multiplexing method as claimed in claim 5, wherein n equals three and therefore three digital signals are combined into a time-division multiplex signal (Mux), wherein the frame is divided into four time slots (ZS), and wherein two adjacent time slots (ZS) are used for one digital signal and one respective time slot (ZS) is used for each of two remaining time slots.

9. Apparatus for transmitting n digital signals of a same bit period where n is greater than or equal to two, comprising:

a multiplexer (1), responsive to the n digital signals for providing a time-division multiplexed signal (Mux) having a duration equal to said bit period (T) with each time slot having a duration less than said bit period divided by n for providing each bit of a selected one of the digital signals in at least two adjacent time slots in the frame and for providing one time slot for each bit of at least one of the remaining digital signals;

a transmission link (2), responsive to the multiplexed signal, for transmitting the multiplexed signal and for providing a transmitted multiplexed signal;

a splitter (3), responsive to the transmitted multiplexed signal for providing a plurality of transmitted multiplexed signal on separate, subdivided links;

a demultiplexer (5), responsive to the transmitted multiplexed signal on one of the separate, subdivided links for demultiplexing the transmitted multiplexed signal for providing the n digital signals at said same bit rate; and a receiver (4), responsive to the transmitted multiplexed signal on another one of said separate, subdivided links for receiving each bit of said selected one of the digital signals in at least two adjacent time slots in the frame of the transmitted multiplexed signal.

10. The apparatus of claim 9, wherein n equals two and therefore two digital signals are combined into said time-division multiplexed signal, wherein the frame is divided into three time slots, and wherein two adjacent time slots are used for one digital signal and one time slot is used for a remaining digital signal.

11. The apparatus of claim 9, wherein n equals two and therefore two digital signals are combined into said time-division multiplexed signal, wherein the frame is divided into four time slots, and wherein three adjacent time slots are used for one digital signal and one time slot is used for a remaining digital signal.

12. The apparatus of claim 9, wherein n equals three and therefore three digital signals are combined into said time-division multiplexed signal, wherein the frame is divided into four time slots, and wherein two adjacent time slots are used for one digital signal, and one respective time slot is used for each of two remaining digital signals.

13. The time-division-multiplexing method of claim 1, wherein each time slot has a duration equal to or less than said bit period divided by n+1.

14. The time-division-multiplexing method of claim 5, wherein each time slot has a duration equal to or less than said bit period divided by n+1.

15. The apparatus of claim 9, wherein each time slot has a duration equal to or less than said bit period divided by n+1.

* * * * *

UNITED STATES PATENT AND TRADEMARK OFFICE
CERTIFICATE OF CORRECTION

PATENT NO. : 5,719,874
DATED : February 17, 1998
INVENTOR(S) : Heidemann et al.

It is certified that error appears in the above-identified patent and that said Letters Patent is hereby corrected as shown below:

On the title page, item
    [56] References Cited

"4,891,808   1/1990   Fallin" should read

--4,891,805   1/1990   Fallin--

Signed and Sealed this

Twenty-third Day of June, 1998

Attest:

BRUCE LEHMAN

*Attesting Officer*      *Commissioner of Patents and Trademarks*